(12) United States Patent
Abdel-Rahman et al.

(10) Patent No.: US 11,986,809 B1
(45) Date of Patent: May 21, 2024

(54) 4,4-DIVINYLAZOARYLENE-BRIDGED DIRUTHENIUM COMPLEX BEARING RU(CO)CL(P$^j$PR3)2 AS AN INORGANIC CATALYST

(71) Applicant: KING FAISAL UNIVERSITY, Al-Ahsa (SA)

(72) Inventors: Obadah S. Abdel-Rahman, Al-Ahsa (SA); Mohamed Shaker S. Adam, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/389,393

(22) Filed: Nov. 14, 2023

(51) Int. Cl.
| | | |
|---|---|---|
| *B01J 31/22* | (2006.01) | |
| *B01J 31/20* | (2006.01) | |
| *B01J 31/24* | (2006.01) | |
| *B01J 37/00* | (2006.01) | |
| *B01J 37/02* | (2006.01) | |
| *B01J 37/03* | (2006.01) | |
| *B01J 37/04* | (2006.01) | |
| *B01J 37/06* | (2006.01) | |
| *C07F 15/00* | (2006.01) | |

(52) U.S. Cl.
CPC ........... *B01J 31/2291* (2013.01); *B01J 31/20* (2013.01); *B01J 31/24* (2013.01); *B01J 37/009* (2013.01); *B01J 37/0236* (2013.01); *B01J 37/031* (2013.01); *B01J 37/04* (2013.01); *B01J 37/06* (2013.01); *C07F 15/0046* (2013.01); *B01J 2531/0205* (2013.01); *B01J 2531/821* (2013.01)

(58) Field of Classification Search
CPC ........ B01J 31/2291; B01J 31/20; B01J 31/24; B07J 37/009
See application file for complete search history.

(56) References Cited

FOREIGN PATENT DOCUMENTS

WO   2022173899 A1   8/2022

OTHER PUBLICATIONS

Yin, Synthesis and properties of conjugated bimetallic ruthenium complexes with sigma, sigma-bridging azobenzene chains, 2005, Journal of Organometallic Chemistry, vol. 690, p. 4265-4271. (Year: 2005).*
Pfaff, Ulrike, et al. "Electronically Strongly Coupled Divinylheterocyclic-Bridged Diruthenium Complexes." Chemistry—A European Journal 22.2 (2016): 783-801.
Wuttke, Evelyn, et al. "Homo-and heterobimetallic 1, 4-divinylphenylene-and naphthalene-1, 8-divinyl-bridged diruthenium, diosmium and ruthenium osmium complexes." Journal of Organometallic Chemistry 821 (2016): 4-18.
Mücke, Philipp, et al. "Vinyl-ruthenium entities as markers for intramolecular electron transfer processes." Inorganica Chimica Acta 374.1 (2011): 36-50.
Maurer, Jörg, et al. "Divinylphenylene-Bridged Diruthenium Complexes Bearing Ru(CO)Cl(PiPr3)2 Entities." Organometallics 25.15 (2006): 3701-3712.

* cited by examiner

*Primary Examiner* — Kamal A Saeed
*Assistant Examiner* — Karen Cheng
(74) *Attorney, Agent, or Firm* — Nath, Goldberg & Meyer; Richard C. Litman

(57) ABSTRACT

A 4,4'-divinylazoarylene-bridged diruthenium complex bearing two Ru(CO)Cl(P$^j$Pr$_3$)$_2$ moieties, its synthesis, and its use as an catalyst in organic processes.

6 Claims, 3 Drawing Sheets

4,4-DIVINYLAZOARYLENE-BRIDGED DIRUTHENIUM COMPLEX BEARING RU(CO)CL(P$^J$PR3)2 AS AN INORGANIC CATALYST

BACKGROUND

1. Field

The present disclosure relates to the compound that is a 4,4'-divinylazoarylene-bridged diruthenium complex bearing two Ru(CO)Cl(P$^i$Pr$_3$)$_2$ moieties, its synthesis, and its use as an catalyst for organic compounds.

2. Description of the Related Art

Since the reporting of ruthenium hydrido complexes of the type {[HRu(CO)Cl(PR$_3$)$_2$] (R=Ph, Me, cyclohexyl, $^i$Pr} in 1960s, considerable interest has been focused on the pivotal catalytic activates of such chemical families towards selective hydrogenation of terminal olefins and alkynes, the coupling of terminal alkynes with carboxylic acid-derived compounds, the dehydrogenation of alcohol to ketones, dialdehydes to lactones, and in particular on regio- and stereospecific insertion of the ruthenium-hydride bond into a terminal —C≡CH bond of the alkyne substrates to form the ruthenium-alkenyl type-families.

More recently, interests in (multi)ruthenium-alkenyl type-complexes have been intensively scrutinized in terms of redox chemistry, electronic coupling, electro switchable poly-electrochromic near infrared (NIR) dyes, tri-, tetra-, and hexametal-organic macrocycles and antiproliferative effects in tumor cell lines.

As these complexes have attracted widespread interests, divinylarylene-bridged diruthenium complexes of the general type [{Ru(CO)(Cl)(P$^i$Pr$_3$)$_2$}$_2$(μ-CH=CH—Ar—CH=CH—)] {Ar=bridging π-conjugated arylene linker} were investigated and revealed to exhibit two consecutive, chemically and electrochemically, well-behaved, reversible one-electron oxidations at well-accessible potentials. The half-wave redox splitting, $\Delta E_{1/2}=E_{1/2}^{+/2+}-E_{1/2}^{0/+}$, between their two individual redox one-electron oxidations waves depends on the π-conjugated arylene linker "bridge" and ranged to be well-separated (strongly coupled) as in the case of five-membered 2,5-N-arylpyrroles-or-furanes-or-thiophenes heterocycles arylene linkers, or moderately coupled as in 4,4'-biphenylenes, 2,2'-bipyridines, and many others arylene linkers or weakly coupled as in the case of the enforced π-stacking of the two phenyl rings in para-[2.2]- or ortho-[2.1]-cyclophanes linkers.

Azoarylenes and its similar related deriviatives were intensively investigated and attracted enormous interests due to straightforward derivatives synthesis step through classical homo-oxidative cross-coupling of aryl diazonium salts using Cu-catalyzed Sandmeyerstyle reaction. Moreover, these chromophores usually show a strong π→π* transition in the UV-Vis regime which can be predictively tuned by introducing substituents on the aryl rings.

SUMMARY

The electrochemical electronic coupling, polyelectrochronic behavior, and the spectro(electro)scopic features of bis(ruthenium-alkenyl) moieties incorporated into azoarylene bridge linker have been investigated as described herein. Accordingly, the present subject matter relates to a novel 4,4'-divinylazoarylene-bridged diruthenium complex bearing two Ru(CO)Cl(P$^i$Pr$_3$)$_2$ entities with the general formula {Ru(CO)Cl(P$^i$Pr$_3$)$_2$}$_2$(μ-{CH=CH—C$_6$H$_2$—(Pr)$_2$-2,6}$_2$—N=N-4,4'), which was successfully prepared via regio- and stereospecific insertion of two equivalent of the ruthenium-hydrido precursor HRu(CO)Cl(P$^i$Pr$_3$)$_2$ into the two terminal —C≡CH bonds of the corresponding 2,2',6,6'-tetraisopropyl-4,4'-diethynylazobenzene. This five-coordinated, square-pyramidal, 16-valence electrons (VEs) type-complex was characterized in its neutral state by classical IR, UV/Vis and NMR spectroscopy technique, and in its two different reachable oxidized states by IR, UV/Vis/NIR spectro-electrochemistry along with electrochemical techniques. Electrochemical studies on the {Ru(CO)Cl(P$^i$Pr$_3$)$_2$}$_2$(μ-{CH=CH—C$_6$H$_2$-($^i$Pr)$_2$-2,6}$_2$—N=N-4,4') complex revealed a single chemically and electrochemically reversible two-electrons oxidation redox wave, which could indicate negligible communication between the two remote redox-active end-groups.

The {Ru(CO)Cl(P$^i$Pr$_3$)$_2$}$_2$(μ-{CH=CH—C$_6$H$_2$-($^i$Pr)$_2$-2,6}$_2$—N=N-4,4') complex as described herein can show strong polyelectrochromic behavior with two distinct states, one of which absorbs mostly in the UV (the neutral form), another one in the border of Vis/NIR region (the mono- and dication forms). First electrochemical oxidation under IR of {Ru(CO)Cl(P$^i$Pr$_3$)$_2$}$_2$(μ-{CH=CH—C$_6$H$_2$-($^i$Pr)$_2$-2,6}$_2$—N=N-4,4') led to gradually replace the neutral Ru(CO) stretching vibrational band into a pattern of two bands; the lower-energy shoulder band is very close to the neutral form while the other higher-energy band on the other hand is close to the fully oxidized [{Ru(CO)Cl(P$^i$Pr$_3$)$_2$}$_2$(μ-{CH=CH—C$_6$H$_2$-($^i$Pr)$_2$-2,6}$_2$—N=N-4,4')]$^{2+}$.

This typical observation pattern confirms a weakly coupled Class I system of Robin-Day classification of MV states. This complex also shows remarkable activity as homogeneous catalyst for applicable chemical manufactories of organic compounds syntheses.

In an embodiment, the present subject matter relates to a 4,4'-divinylazobenzene-bridged diruthenium complex bearing two Ru(CO)Cl(P$^i$Pr$_3$)$_2$ moieties having the formula I:

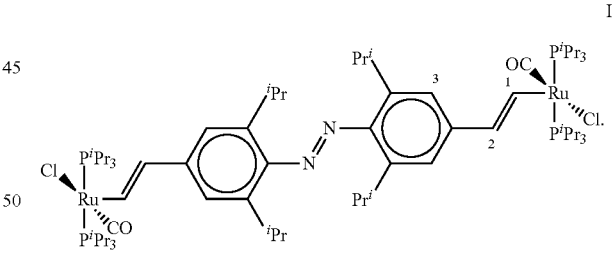

I

In a further embodiment, the present subject matter relates to a metallic complex that may act as a catalyst.

In one more embodiment, the present subject matter relates to a method of making the 4,4'-divinylazoarylene-bridged diruthenium complex bearing two Ru(CO)Cl(P$^i$Pr$_3$)$_2$ moieties, the method comprising: adding 2,2',6,6'-tetraisopropyl-4,4'-diethynylazobenzene in CH$_2$Cl$_2$ to a solution of HRu(CO)Cl(P$^i$Pr$_3$)$_2$ in CH$_2$Cl$_2$ to obtain a reaction mixture; stirring the reaction mixture for at least about 1 hour to obtain a precipitate; removing the CH$_2$Cl$_2$ under reduced pressure; washing the precipitate to remove unreacted starting material; filtering and drying the precipitate; and obtaining the 4,4'-divinylazoarylene-bridged diruthenium complex bearing two Ru(CO)Cl(P$^i$Pr$_3$)$_2$ moieties.

These and other features of the present subject matter will become readily apparent upon further review of the following specification.

DETAILED DESCRIPTION OF THE PREFERRED EMBODIMENTS

Figure 1:
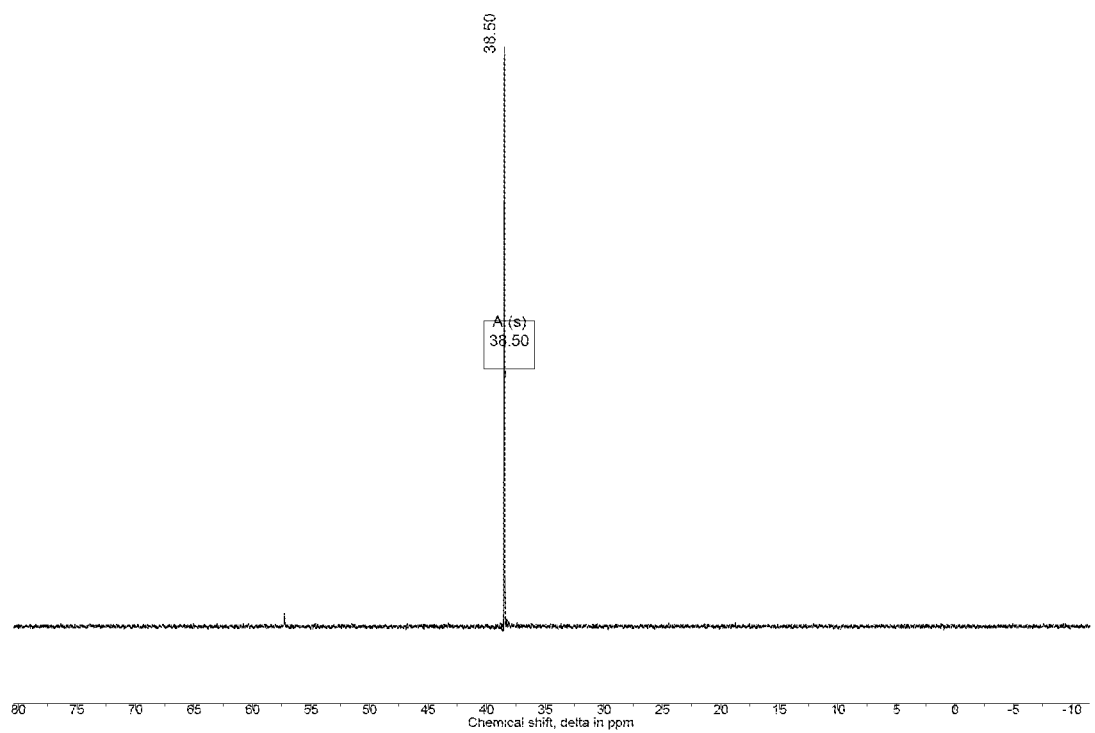
FIG. 1 shows an $^{31}$P-NMR analysis at 162 MHz, $CD_2Cl_2$ of 4,4'-divinylazoarylene-bridged diruthenium complex bearing two $Ru(CO)Cl(P^iPr_3)_2$ moieties.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a novel 4,4'-divinylazoarylene-bridged diruthenium complex bearing two $Ru(CO)Cl(P^iPr_3)_2$ entities with the general formula [{Ru(CO)Cl(P$^i$Pr$_3$)$_2$}$_2$(μ-{CH=CH—C$_6$H$_2$-($^i$Pr)$_2$-2,6}$_2$—N=N-4,4')]. This five-coordinated, square-pyramidal, 16-valence electrons (VEs) type-complex was characterized in its neutral state by classical IR, UV/Vis and NMR spectroscopy technique, and in its two different reachable oxidized states by IR, UV/Vis/NIR spectro-electrochemistry along with electrochemical techniques. The 4,4'-divinylazoarylene-bridged diruthenium complex bearing two $Ru(CO)Cl(P^iPr_3)_2$ moieties may function as a catalyst in organic processes.

The product can be acquired in exceptional yields (average about 86%) using a two-component reaction between 2,2',6,6'-tetraisopropyl-4,4'-diethynylazobenzene in $CH_2Cl_2$ and $HRu(CO)Cl(P^iPr_3)_2$ in $CH_2Cl_2$. The reaction components could be purified by some non-chromatographic techniques. The product can be analyzed using spectral data; IR, NMR & elemental analysis. The prepared compound can be used as a catalyst for organic processes.

In an embodiment, the present subject matter relates to a 4,4'-divinylazoarylene-bridged diruthenium complex bearing two $Ru(CO)Cl(P^iPr_3)_2$ moieties having the formula I:

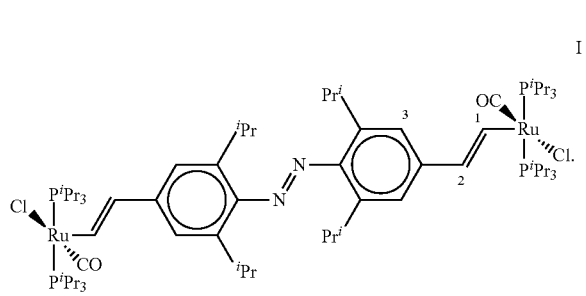

In another embodiment, the present subject matter relates to a catalyst for organic reactions and processes.

In one more embodiment, the present subject matter relates to a method of making the 4,4'-divinylazoarylene-bridged diruthenium complex bearing two Ru(CO)Cl(P$^i$Pr$_3$)$_2$ moieties. The method includes a 2-step process where first 2,2',6,6'-tetraisopropyl-4,4'-diethynylazobenzene is synthesized. Then, the 4,4'-divinylazoarylene-bridged diruthenium complex bearing two Ru(CO)Cl(P$^i$Pr$_3$)$_2$ moieties is synthesized from the 2,2',6,6'-tetraisopropyl-4,4'-diethynylazobenzene.

The method for synthesizing 2,2'-dimethyl-4,4'-diethynylazobenzene begins with 2,6-diisopropylaniline being suspended in 20 mL HCl and water. At 0° C. the amine group is diazotized by slowly adding a solution of NaNO$_2$ in water. After stirring the mixture at about 0° C. for at least about 1 hour, the solution is carefully transferred via a cannula into a freshly prepared solution of CuSO$_4$·5H$_2$O, NH$_4$OH, NH$_2$OH and NaOH in 50 mL water. Then stirring continues at about 25° C., and the reaction mixture is heated up to about 70° C. for about at least 1 hour. The resulting mixture is then cooled down and acidified with HC. The crude residue is taken up in a mixture of CH$_2$Cl$_2$ and distilled water. The organic layer is extracted with CH$_2$Cl$_2$. The combined organic layers may be dried over MgSO$_4$ and the solvent may be evaporated in vacuo. Purification by column chromatography gives the desired 4,4'-diiodoazoarylene as an orange crystalline solid.

Next, a degassed solution of 2,2',6,6'-tetraisopropyl-4,4'-diiodoazobenzene, triphenylphosphine and excess trimethylsilylacetylene (TMSA) in dry trimethylamine is added to a mixture of CuI and PdCl$_2$(PPh$_3$)$_2$ in tetrahydrofuran (THF). The resulting mixture is stirred and heated to reflux overnight. Additional amounts of TMSA are added to ensure complete consumption of the starting material (TLC control). When the reaction is finished, the solvent is evaporated under vacuum and the residue is taken up in CH$_2$Cl$_2$ and filtered over silica gel. Purification by column chromatography gave the desired 2,2',6,6'-tetraisopropyl-4,4-bis((trimethylsilyl)ethynyl)azobenzene as an orange crystalline solid.

Then, 2,2',6,6'-tetraisopropyl-4,4'-bis((trimethylsilyl)ethynyl)azobenzene is dissolved in a methanol/THF mixture and excess potassium carbonate is added. The completeness of the reaction is controlled via TLC for at least about 1 hour. After full conversion, the solvent is evaporated under vacuum. The crude residue is taken up in a mixture of CH$_2$Cl$_2$ and distilled water and the organic layer is extracted three times with CH$_2$Cl$_2$. The combined organic layers are dried over MgSO$_4$ and the solvent is removed in vacuo to provide the desired 2,2',6,6'-tetraisopropyl-4,4'-diethynylazobenzene, as an orange solid.

Finally, the 4,4'-divinylazoarylene-bridged diruthenium complex bearing two Ru(CO)Cl(P$^i$Pr$_3$)$_2$ moieties can be synthesized by a method comprising: adding 2,2',6,6'-tetraisopropyl-4,4'-diethynylazobenzene in CH$_2$Cl$_2$ to a solution of HRu(CO)Cl(P$^i$Pr$_3$)$_2$ in CH$_2$Cl$_2$ to obtain a reaction mixture; stirring the reaction mixture for at least about 1 hour to obtain a precipitate; removing the CH$_2$Cl$_2$ under reduced pressure; washing the precipitate to remove unreacted starting material; filtering and drying the precipitate; and obtaining the 4,4'-divinylazoarylene-bridged diruthenium complex bearing two Ru(CO)Cl(P$^i$Pr$_3$)$_2$ moieties.

In another embodiment of the present production methods, the precipitate is washed with n-hexane and MeOH.

In a further embodiment of the present production methods, the precipitate is dried in vacuo.

In an embodiment of the present production methods, the HRu(CO)Cl(P$^i$Pr$_3$)$_2$ and the 2,2',6,6'-tetraisopropyl-4,4'-diethynylazobenzene may be added in an about 0.42:0.25 molar ratio.

In an additional embodiment of the present production methods, the 4,4'-divinylazoarylene-bridged diruthenium complex bearing two Ru(CO)Cl(P$^i$Pr$_3$)$_2$ moieties can be obtained in an about 86% yield.

The following examples relate to various methods of manufacturing the specific compounds and application of the same, as described herein. All compound numbers expressed herein are with reference to the synthetic pathway figures shown above.

EXAMPLES

Example 1

Preparation of 2,2',6,6'-tetraisopropyl-4,4'-diiodoazobenzene 2,6-Diisopropylaniline (0.07 mmol) was suspended in 20 mL HCl and 50 mL water. At 0° C. the amine group was diazotized by slowly adding a solution of NaNO$_2$ (5.8 g, 0.08 mol, 1.2 eq.) in 25 mL water. After stirring the mixture at 0° C. for 1 hour, the solution was carefully transferred via a cannula into a freshly prepared solution of CuSO$_4$·5H$_2$O (34.7 g, 0.14 mol, 2.0 eq.), NH$_4$OH (75 mL, 0.48 mmol, 6.9 eq.), NH$_2$OH (10.3 g. 0.15 mmol, 2.1 eq.) and 5 g of NaOH in 50 mL water. Then stirring was continued at 25° C., and the reaction mixture was heated up to 70° C. for 1 hour. The resulting mixture was cooled down and acidified with 25 mL HCl (37%). The crude residue was taken up in a mixture of CH$_2$Cl$_2$ and distilled water and the organic layer was extracted three times with CH$_2$Cl$_2$. The combined organic layers were dried over MgSO$_4$ and the solvent was evaporated in vacuo. Purification by column chromatography (eluent: petroleum ether/dichloromethane, 5:1) gave the desired 2,2',6,6'-tetra-isopropyl-4,4'-diiodoazoarylene as an orange crystalline solid.

Characterization of the prepared compound was determined using $^1$H NMR. The elemental analysis can be seen as follows.

2,2',6,6'-tetra-isopropyl-4,4'-diiodoazobenzene δ 7.09 (s, 4H, H$_{(1)}$), 2.97 (hept, 4H, $^3$J=6.7 Hz, CH(CH$_3$)$_2$), 1.12 (d, 24H, $^3$J=6.7 Hz, (CH$_3$)$_2$CH) ppm.

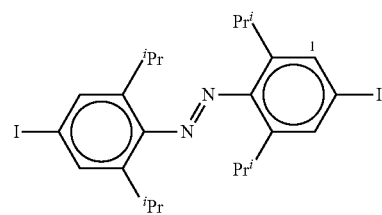

Example 2

Preparation of 2,2',6,6'-tetraisopropyl-4,4'-bis((trimethylsilyl)ethynyl)azobenzene A degassed solution of 2,2',6,6'-tetraisopropyl-4,4'-diiodoazobenzene (0.9 mmol), triphenylphosphine (3 mol %) and 0.4 mL (2.7 mmol, 3 eq.) of excess trimethylsilylacetylene (TMSA) in dry 15 mL trimethylamine was added to a mixture of CuI (10 mol %) and $PdCl_2(PPh_3)_2$ (5 mol %) in 15 mL THF. The resulting mixture was stirred and heated to reflux overnight. Additional amounts of TMSA were added to ensure complete consumption of the starting material (TLC control). When the reaction was finished, the solvent was evaporated under vacuum and the residue was taken up in 5 mL $CH_2Cl_2$ and filtered over silica gel. Purification by column chromatography (eluent: petroleum ether/dichloromethane, 9:1) gave the desired 2,2',6,6'-tetraisopropyl-4,4'-bis((trimethylsilyl)ethynyl)azobenzene as an orange crystalline solid.

Characterization of the prepared compound was determined using $^1H$ NMR. The elemental analysis can be seen as follows.

2,2',6,6'-tetraisopropyl-4,4'-bis((trimethylsilyl)ethynyl) azobenzene δ 7.13 (s, 4H, $H_{(1)}$), 2.86 (hept, 4H, $^3J$=6.8 Hz, $CH(CH_3)_2$), 1.25 (d, 24H, $^3J$=6.7 Hz, $(CH_3)_2CH$), 0.25 (s, 18H, TMS) ppm.

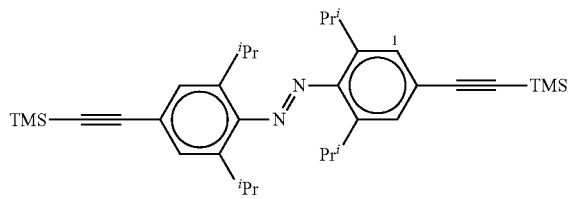

Example 3

Preparation of 2,2',6,6'-tetraisopropyl-4,4'-diethynylazobenzene 2,2',6,6'-tetraisopropyl-4,4'-bis((trimethylsilyl)ethynyl) azobenzene (1.0 mmol) was dissolved in a methanol/THF mixture (10 mL/10 mL) and excess potassium carbonate (346 mg, 2.5 mmol, 2.5 eq.) was added. The completeness of the reaction was controlled via TLC (1 hour). After full conversion, the solvent was evaporated under vacuum. The crude residue was taken up in a mixture of $CH_2Cl_2$ and distilled water and the organic layer was extracted three times with $CH_2Cl_2$. The combined organic layers were dried over $MgSO_4$ and the solvent was removed in vacuo to provide the desired 2,2',6,6'-tetraisopropyl-4,4'-diethynylazobenzene, as an orange solid.

Characterization of the prepared compound was determined using 1H NMR. The elemental analysis can be seen as follows.

Elemental analysis for $C_{28}H_{34}N_2$: C: 84.37; H: 8.60; N: 7.03. Found: C: 83.96; H: 8.53; N: 7.12%. UV-Vis ($\lambda_{max}$ (nm), ε($M^{-1} \cdot cm^{-1}$)): 262 (1.5·10$^4$), 312 (1.8·10$^4$), 478 (1.9·10$^3$). 1H-NMR (400 MHz, $CD_2Cl_2$): δ 7.12 (s, 4H, H(1)), 2.87 (hept, 4H, $^3J$=6.8 Hz, $CH(CH_3)_2$), 1.23 (d, 24H, $^3J$=6.7 Hz, $(CH_3)_2CH$), 3.25 (s, 2H, 2HC≡C) ppm.

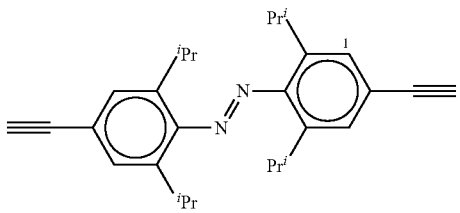

Example 4

Preparation of 4,4'-divinylazoarylene-bridged diruthenium complex bearing two $Ru(CO)Cl(P^iPr_3)_2$ To a stirred solution of $HRu(CO)Cl(P^iPr_3)_2$ (200 mg, 0.42 mmol, 1 eq.) in 5 mL of $CH_2Cl_2$ was slowly added via cannula a solution of 2,2',6,6'-tetraisopropyl-4,4'-diethynylazobenzene (0.25 mmol, 0.6 eq.) in 5 mL of $CH_2Cl_2$. Upon addition, the color of the solution changed immediately from pale orange to deep red. The reaction mixture was stirred for an additional hour and the solvent was removed under reduced pressure. The crude pink precipitate was washed with 15 mL of n-hexane and 15 mL of MeOH to remove the unreacted starting material, then filtered and dried in vacuo to give the product as a red solid. 33.6 mg (0.13 mmol, 0.6 eq.) of 2,2',6,6'-tetraisopropyl-4,4'-diethynylazobenzene yielded 123 mg (0.09 mmol, 86%) of complex.

Figure 2:
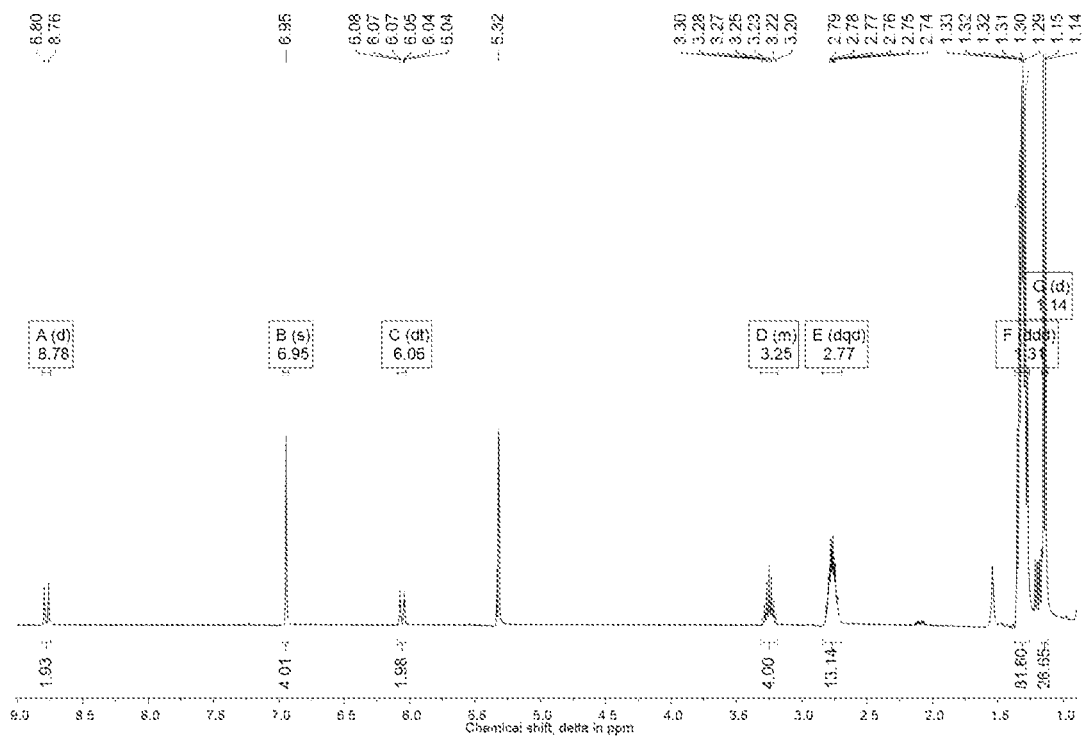
FIG. 2 shows a $^1$H NMR analysis of the 4,4'-divinylazoarylene-bridged diruthenium complex bearing two $Ru(CO)Cl(P^iPr_3)_2$ moieties.
Figure 3:
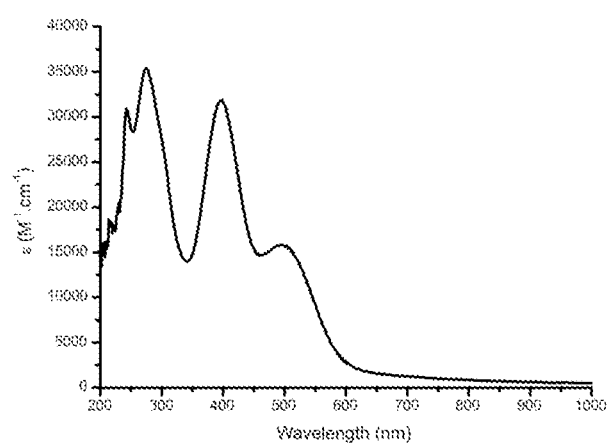
FIG. 3 shows a UV/Vis spectrum of the 4,4'-divinylazoarylene-bridged diruthenium complex bearing two $Ru(CO)Cl(P^iPr_3)_2$ moieties in $CH_2Cl_2$.

Characterization of the prepared compound was determined using $^{31}P$-NMR and $^1H$ NMR, respectively, which is shown in FIGS. 1 and 2. The elemental analysis can be seen as follows.

Elemental analysis for $C_{66}H_{120}Cl_2N_2O_2P_4Ru_2$: C: 57.84; H: 8.82; N: 2.04. Found: C: 57.67; H: 8.56; N: 2.01%. UV-Vis ($\lambda_{max}$ (nm), ε($M^{-1} \cdot cm^{-1}$)): 243 (3.1·10$^4$), 275 (3.6·10$^4$), 396 (3.2·10$^4$), 498 (1.6·10$^4$). IR (ATR, ν in $cm^{-1}$): 2962, 2925 (C—H aryl, vinyl); 1908 (C≡O); 1592, 1562, 1472 (C=C aryl, vinyl); 1530 (N=N). $^1H$-NMR (400 MHz, $CD_2Cl_2$) as depicted in FIG. 2 δ: 8.78 (d, 2H, $^3J_{H(1)-H(2)}$=13.4 Hz, $H_{(1)}$), 6.95 (s, 4H, $H_{(3)}$), 6.06 (dt, $^3J_{H(2)-H(1)}$=13.3 Hz, $^4J_{H(2)-P}$=2.0 Hz, $H_{(2)}$), 3.32 (hept, 4H, $^3J$=6.7 Hz, $CH(CH_3)_2$), 2.77 (m, 12H, $CHP(CH_3)_2$), 1.31 (m, 72H, $(CH_3)_2PCH$), 1.14 (d, 24H, $^3J$=6.7 Hz, $(CH_3)_2CH$) ppm. $^{31}P$-NMR (162 MHz, $CD_2Cl_2$) as depicted in FIG. 1: δ 38.50 (s, $P^iPr_3$) ppm.

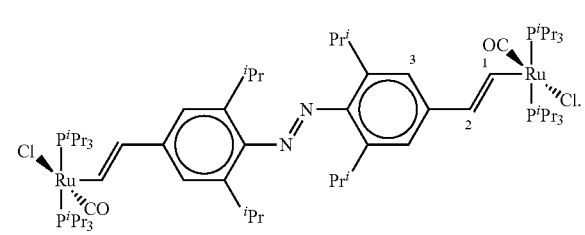

Example 5

Experimentation

This five-coordinated, square pyramidal, 16-valence electrons (VEs) complex 4,4'-divinylazobenzene-bridged diruthenium complex bearing two $Ru(CO)Cl(P^iPr_3)_2$ moieties contains two {Ru(CO)Cl(P$^i$Pr$_3$)$_2$(CH=CH)}={Ru} end-groups that are linked by an azoarylene bridge linker. 4,4'-divinylazobenzene-bridged diruthenium complex bearing two Ru(CO)Cl(P$^i$Pr$_3$)$_2$ moieties was routinely characterized in the neutral state by conventional IR, UV/Vis and NMR spectroscopy and analytical techniques, and in its two different reachable oxidized states by IR, UV/Vis/NIR spectro-electrochemistry. The identity of 2,2'-dimethyl-4,4'-diethynylazobenzene and its corresponding bis(rutheniumalkenyl) 4,4'-divinylazobenzene-bridged diruthenium complex bearing two Ru(CO)Cl(P$^i$Pr$_3$)$_2$ moieties follows the correct numbers and integrations of their $^1$H-NMR data. In their $^{13}$P-NMR spectra, 4,4'-divinylazobenzene-bridged diruthenium complex bearing two Ru(CO)Cl(P$^i$Pr$_3$)$_2$ complex, likewise other ruthenium-alkenyl of similar family, showed a sharp singlet resonance at δ=38.5 ppm, confirming that the four P$^i$Pr$_3$ ligands are chemically equivalent in which two of them are trans-disposed at each {Ru} end-groups. $^1$H-NMR spectrum shows a sharp singlet of the two equivalent terminal ethynyl protons for the free alkyne at δ=3.3 ppm while one set of the resonance signals at δ 2.4 ppm and δ 1.3 ppm for the methine CHP(CH$_3$)$_2$ and methyl (CH$_3$)$_2$PCH protons of the four equivalent P$^i$Pr$_3$ ligands, respectively in the 4,4'-divinylazobenzene-bridged diruthenium complex bearing two Ru(CO)Cl(P$^i$Pr$_3$)$_2$ complex. The latter also showed classical doublet at δ8.94 ppm and doublet of triplet at δ6.07 ppm of the four equivalent vinylic protons Ru—CH=(H$_1$) and Ru—CH=CH (H$_2$) with a large coupling constant $^3J_{H-H}$ of about 13.3 Hz, respectively. This high coupling constant confirms a trans-geometry at the two vinylic double bonds resulting from cis-insertion of the diethynylazoarylene into the Ru—H bond in a regio- and stereospecific manner.

Electrochemical oxidation to first oxidation led to gradually replace the neutral Ru(CO) stretching vibrational band into a pattern of two bands; the lower-energy shoulder band is very close to the neutral form while the other higher-energy band is closer to the fully oxidized. This typical observation pattern confirms a weakly coupled Class 1 system of Robin-Day classification for MV states.

Cross coupling systems play the most effective role in the development of the chemical industrial processes. Homogenous catalysts of transition mental complexes are of great interest for synthesizing fine-chemical/specialty chemical/medical and pharmaceutical products for their high activity and modified chemo-, stereo-, and regio-selectivity advantages within the widely used cross coupling reaction of C—C, C—O, C—N and C—S bonding. The most recent chemical transformation consumes high energy for selective productivity.

Accordingly, designing novel and more effective homogenous metal-organic complex catalysts is an essential demand in the industrial fields. The catalytic reactivity of homogenous metal-organic complex catalysts is influenced by the nature of both the central metal ion and the coordinated backbone ligands. The central metal ion's effect could be observed in its ability to approach the reacting components to achieve the catalytic processes to the selective productivity. The role of the donor centers of the coordinated backbone ligand could enhance the catalytic efficacy of the metal-organic framework catalysts Using ruthenium, as central metal ions instead of di-nuclear complex in the metal-organic framework catalysts could improve the catalytic effectiveness of the catalyst by reducing the consumed time and temperature.

It is to be understood that the 4,4'-divinylazoarylene-bridged diruthenium complex bearing two Ru(CO)Cl(P$^i$Pr$_3$)$_2$ moieties, compositions containing the same, and methods of using and producing the same are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:
1. A {Ru(CO)Cl(P$^i$Pr$_3$)$_2$}2(μ-{CH=CH—C$_6$H$_2$-($^i$Pr)$_2$-2,6}$_2$—N=N-4,4') complex bearing two Ru(CO)Cl(P$^i$Pr$_3$)$_2$ moieties having the formula I:

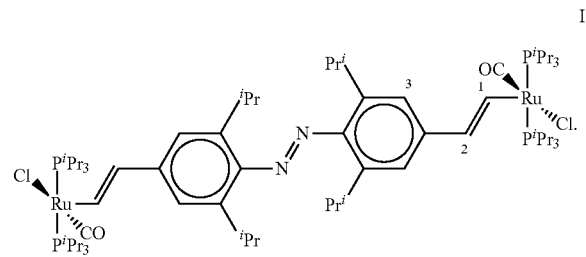

2. A method of making the 4,4'-divinylazoarylene-bridged diruthenium complex bearing two Ru(CO)Cl(P$^i$Pr$_3$)$_2$ moieties of claim 1, the method comprising:
adding 2,2',6,6'-tetraisopropyl-4,4'-diethynylazobenzene in CH$_2$Cl$_2$ to a solution of HRu(CO)Cl(P$^i$Pr$_3$)$_2$ in CH$_2$Cl$_2$ to obtain a reaction mixture;
stirring the reaction mixture for at least about 1 hour to obtain a precipitate;
removing the CH$_2$Cl$_2$ under reduced pressure;
washing the precipitate to remove unreacted starting material;
filtering and drying the precipitate; and
obtaining the 4,4'-divinylazoarylene-bridged diruthenium complex bearing two Ru(CO)Cl(P$^i$Pr$_3$)$_2$ moieties.
3. The method of making the 4,4'-divinylazoarylene-bridged diruthenium complex bearing two Ru(CO)Cl(P$^i$Pr$_3$)$_2$ moieties of claim 2, wherein the precipitate is washed with n-hexane and MeOH.
4. The method of making the 4,4'-divinylazoarylene-bridged diruthenium complex bearing two Ru(CO)Cl(P$^i$Pr$_3$)$_2$ moieties of claim 2, wherein the precipitate is dried in vacuo.
5. The method of making the 4,4'-divinylazoarylene-bridged diruthenium complex bearing two Ru(CO)Cl(P$^i$Pr$_3$)$_2$ moieties of claim 2, wherein the HRu(CO)Cl(P$^i$Pr$_3$)$_2$ and the 2,2',6,6'-tetraisopropyl-4,4'-diethynylazobenzene are added in an about 0.42:0.25 molar ratio.
6. The method of making the 4,4'-divinylazoarylene-bridged diruthenium complex bearing two Ru(CO)Cl(P$^i$Pr$_3$)$_2$ moieties of claim 2, wherein the 4,4'-divinylazoarylene-bridged diruthenium complex bearing two Ru(CO)Cl(P$^i$Pr$_3$)$_2$ compound is obtained in an about 86% yield.

* * * * *